United States Patent [19]

Nakajima et al.

[11] Patent Number: 4,542,031
[45] Date of Patent: Sep. 17, 1985

[54] PROCESS FOR THE PRODUCTION OF ANIMAL FEEDSTUFF

[75] Inventors: Taiji Nakajima; Tsuneo Togawa; Masao Koike, all of Yokohama, Japan

[73] Assignee: Nippon Formula Feed Manufacturing Co. Ltd., Tokyo, Japan

[21] Appl. No.: 682,590

[22] Filed: Dec. 17, 1984

Related U.S. Application Data

[63] Continuation-in-part of Ser. No. 382,802, May 27, 1982, abandoned.

[30] Foreign Application Priority Data

May 30, 1981 [JP] Japan .................................. 56-81872

[51] Int. Cl.⁴ ................................................ A23K 1/00
[52] U.S. Cl. .................................... 426/307; 426/335; 426/453; 426/532; 426/623; 426/630; 426/807; 426/518
[58] Field of Search ................. 426/74, 335, 532, 302, 426/307, 310, 98, 99, 453, 454, 805, 807, 518

[56] References Cited

U.S. PATENT DOCUMENTS

| | | | |
|---|---|---|---|
| 2,835,586 | 5/1958 | Peebles | 426/453 |
| 2,934,434 | 4/1960 | Hartman et al. | 426/453 |
| 3,231,386 | 1/1966 | Hutton et al. | 426/453 |
| 3,251,291 | 5/1966 | Thompson et al. | 426/453 |
| 3,514,300 | 5/1970 | Mishkin et al. | 426/453 |
| 3,647,480 | 3/1972 | Cermak | 426/453 |
| 4,049,835 | 9/1977 | Haas et al. | 426/805 |
| 4,212,894 | 7/1980 | Franzen | 426/805 |
| 4,252,834 | 2/1981 | Inamine et al. | 426/307 |
| 4,284,652 | 8/1981 | Christensen | 426/805 |
| 4,323,584 | 4/1982 | Saldien | 426/453 |

*Primary Examiner*—R. B. Penland
*Attorney, Agent, or Firm*—Browdy and Neimark

[57] ABSTRACT

A highly palatable soft granular foodstuff suitable for a wide range of animals including both livestock and fish is prepared by adding propylene glycol and a fatty component to the basic nutritional components, moisture content being adjusted. No heat treatment is necessary.

1 Claim, No Drawings

PROCESS FOR THE PRODUCTION OF ANIMAL FEEDSTUFF

This application is a continuation-in-part, of application Ser. No. 382,802, filed May 27, 1982 abandoned.

DESCRIPTION

The present invention relates to process for the production of animal feedstuff.

Processed feedstuffs for animals prepared by the admixture of various materials are well known and have previously been produced by a variety of means, including pulverization, pressure treatments, etc. Previously proposed feedstuffs may be classified into one of two kinds, namely feedstuffs in powder form and feedstuffs in pellet or granule form.

Feedstuffs in powder form suffer from certain disadvantages. In particular, feedstuffs in powder form tend to scatter, thereby to be wasted and to produce insanitary conditions. Previously proposed feedstuffs in pellet or granular form have been produced in a number of ways. One common process is to steam powdery materials, and then to introduce such materials into a pellet-mill to be pressed and kneaded as they pass between rollers and to be extruded from a pellet-die to produce the desired size of pellet. For ease of production and to produce the desired size, lignin, wheat powder or molasses may be employed as a binder. Pelleted animal foodstuff is commonly produced in pellets of generally cylindrical form with a circular or square cross section with a thickness of between 2 to 15 mm and a length of 5 to 20 mm.

Feedstuff may also be produced in the form of expanded granules, which are commonly prepared by subjecting powdery materials to high temperature and pressure, for example in an extruder or expander wherein the powdery materials are moistened with water or steam at elevated temperature and at a pressure of between 20 to 30 Kg/cm$^3$ and then extruded from the pressurized atmosphere into ambient atmosphere through a perforated die plate. Feedstuffs in granular form may also be prepared by pulverizing or sifting solid products or by binding powdery materials by blowing or spraying water or other binders thereon. The process is suitably carried out in a granulating machine of the fluidized-bed, rotary drum or rotary plate type and the binder to be used may comprise alpha-starch, carboxy-alpha-starch, carboxymethylcellulose (CMC), gelatin, gua-gum, sodium casein, or gum arabic, which binders may be used either in gelatin-like fluids or in solution with water or other suitable solvent.

Granular feedstuffs of the above described types suffer from the disadvantages that they tend to be relatively hard often requiring to be softened by water or a solution of additives to become palatable. The previously proposed granular foodstuff being unattractive to the animal is commonly not consumed with gusto. The above mentioned foodstuffs in expanded granule form tend to be relatively expensive involving complicated production steps to produce expansion of the texture of the foodstuff; they also suffer from difficulty in being stored in a dry state without being damaged by atmospheric moisture.

The U.S. Pat. No. 4,284,652 (Christensen) relates to a matrix comprising starch, fat, polyhydric alcohol and water which results in a soft, pliable, and stretchable composition having good palatability. To this matrix may be added sufficient protein and other ingredients for forming a suitable food. While the product of this patent has a desirable soft texture but yet is relatively dry, several drawbacks to this product exist for its use as a livestock feed.

The product of the Christensen patent is an extrudable matrix containing feedstuff. To form this product into a suitable material for pet food, the matrix having food therein is extruded to form small strands of pet food. Since the food product is extrudable, it is quite clear that each particle of food in the final product can adhere to an adjacent food particle. While this adhering property is not a major difficulty in pet foods, since the final product may be wrapped in the form of a hamburger-like patty and since the size and shape of the particles or strands of the final product of the typical pet food are such that the tendancy to agglomerate is diminished, in a granular pet feed, such as that used for feeding livestock, agglomeration can cause extreme difficulties.

Feedstuff for livestock must be in pellet form and preferably of a small size, so that many types of livestock are able to utilize the feed. Further, it is necessary, as a matter of livestock economics, that the feedstuff be flowable, so that automatic feeders may be employed. Thus, the granules of a granular feedstuff must not tend to agglomerate. Accordingly, the feedstuff produced in the Christensen patent is unsuitable as a granular feedstuff.

Also, the feedstuff described by the Christensen patent requires that gelled or cooked starch be employed in the matrix, if a highly derivatized starch is not used. Thus, not only must starch be included in Christensen, but the starch must either be subject to an energy-consuming cooking step or be highly derivatized and therefore more expensive than ordinary starch. In the present invention, starch is not a necessary ingredient and may be excluded.

In accordance with a first aspect of the present invention, there is provided animal feedstuff in soft granular form which contains, in addition to nutrient components, 1 to 10% by weight of propylene glycol, 2 to 30% by weight of fatty components consisting of fat and/or oil, and 2 to 25% by weight of moisture, and having a moisture activity of less than 0.90.

In a second and alternative aspect of the present invention, there is provided a process for the production of animal feedstuff in soft granular form, comprising the steps of: providing a mixture of nutrient materials; preparing a fluid by fluidizing fatty components consisting of fat and/or oil with propylene glycol at a temperature of 70° C. or less; and adding the said mixture and the said fluid together in a granulator for a time sufficient to mix said mixture and said fluid and to produce a product in soft granular form.

According to a third alternative aspect of the present invention, we provide a process for producing animal feedstuff in soft granular form, comprising the steps of: mixing nutrient materials in a mixer; adding propylene glycol to the mixture in said mixer while stirring; stopping the mixer and allowing the mixture to stand for a time sufficient to allow the mixture to cake and to solidify; reoperating the mixer and removing the resultant particles therefrom; transferring the particles of mixture to a pulverizer to form fine particles; spraying a fatty component comprising fat and/or oil over the fine particles, and cooling the resultant mass to room temperature to obtain a granular product.

We have found that feedstuffs in accordance with the present invention can be adapted for feeding to livestock animals such as pigs, cows or sheep, to fowls such as chicken, duck, quail and turkey, and also can be adapted for feeding to young livestock such as calves, piglets, etc, or to laboratory animals such as rats and monkeys. Feedstuffs in accordance with the present invention can also be adapted for feeding to fish such as young yellowtail, carp, trout, sweetfish and eels. Feedstuffs in accordance with the present invention have reasonable caking properties and has proved attractive to all the above animals and fish, being consumed with gusto.

Because examples of feedstuffs in accordance with the present invention have proved so attractive to livestock, the animals show rapid increase in weight when fed on or partially on feedstuff in accordance with the present invention.

The feedstuff mixes well with water and can accordingly be used to produce a substitute milk for young animals not yet weaned.

We have found that though the moisture content of feedstuff in accordance with the present invention is relatively high, its shape is maintained over a lengthy period and that it is not readily susceptible to microbial attack, as by moulds, so that it remains in a stable state for a lengthy period. Because of the granular nature of the feedstuff, it is both easy to transport and to pass to animals at the point of feeding.

The invention should be seen against the background in the production of granular or pelletized feedstuffs for animals and may, alternatively, be seen as a selection from the prior art proposals.

Propylene glycol was approved for use as a food additive in 1941 in the United States of America and since then it has found a use as a solvent for various food additives. Propylene glycol is also employed in the production of cosmetics, medicaments, and for antifreeze. It has also been widely used as a wetting agent and an emulsifying agent. In the United States of America, propylene glycol has been approved as an additive to animal feedstuffs by the Food & Drug Administration and has been included in medicated food pellets for the prevention of Ketosis disease in ruminants such as the cow.

Propylene glycol has also been added to dog food. Reference may be made to Japanese unexamined Patent Publication Nos: 18262/1975 and 18268/1975 which propose the addition of 1 to 10% by weight of polyvalent alcohol such as propylene glycol in semi-moist dog food having a moisture content of 20 to 40% by weight.

Japanese unexamined Patent Publication No. 151680/1975 discloses animal feedstuff having a moisture content of 35 to 60% by weight which is prepared by subjecting a mixture of the ingredients, containing propylene glycol, to heat treatment at a temperature of more than 65.6° C. (150° F.) for a time sufficient to heat protein contained therein.

Thus far, these prior proposals may superficially appear similar to the feedstuff the subject of the present invention; but as will appear from the description below, the present feedstuffs are clearly to be distinguished both as to composition, qualities, and process of manufacture.

While fatty components composed of oil and/or fat have previously been added to animal feedstuff to render it more attractive and more palatable, we are not aware of the addition of oils and/or fats to animal feedstuffs to improve caking efficiency or to stabilize added propylene glycol. Again, so far as we are aware, a fatty component composed of oils and/or fats has not previously deliberately been added to animal feedstuffs to strengthen, stabilize and maintain the granular form of the feedstuff.

The present invention is based upon the discovery by the present inventors that the addition of an appropriate proportion of propylene glycol to an animal feedstuff in powder form promotes caking efficiency.

Feedstuffs in powdered form are readily available and include dairy products or by-products such as skim milk, dried whey powder and casein, vegetable proteins in powder form such as dried extracted soybean protein, de-fatted soybeans and cottonseed cake, and sugar products such as glucose, sucrose, lactose and dextrine, and also powdery alphanized starch products obtained from rice, wheat, corn or potato.

The extent of the caking effect achieved by the addition of propylene glycol to animal foodstuff in powder form depends upon various factors including the nature of the foodstuff, its granule size and moisture content and conditions such as temperature and humidity, the relative proportion of propylene glycol added, and the time from the addition of propylene glycol.

If propylene glycol alone is added to a powdered animal foodstuff, the resulting mixture being stirred and then left to stand for a period between a few minutes and a few hours, a porous solid foodstuff results. The product so obtained may be pulverized by any conventional method and a granular product with a selected grain size may be selected, as by sieving, from the pulverized product.

However, we have not found granular feedstuff in which the sole additive is propylene glycol to be adequate for our purpose. We regard its dimensional stability as inferior as the granules tend gradually to collapse into powder under normal atmospheric pressure conditions and the granules tend to adhere to each other to form a solid clod-like mass, particularly when an excess of propylene glycol is added.

We have found that the propylene glycol should be present in an amount of 1 to 10% by weight of the final product for results which are acceptable to us to be obtained. Even in the case of an animal foodstuff containing as its main component skimmed milk, sucrose or a similar granulated material, if the proportion of propylene glycol is less than 1% by weight, sufficient caking effect is not obtained. For best results, the minimum proportion of propylene glycol should be 2% by weight. On the other hand, where propylene glycol is present in an amount exceeding 10% by weight of the final product, the caking effect becomes too great and it becomes difficult to granulate the feedstuff. The preferred upper limit for best results is 8% by weight of propylene glycol.

We have found that the addition of a fatty component composed of oils and/or fats in combination with the addition of propylene glycol results in granular animal foodstuff of much improved quality in which the granules do not tend to collapse readily into powder under atmospheric conditions such as atmospheric pressure and humidity. Put another way, the Applicants have found that the combination of propylene glycol with a fatty component consisting of oils and/or fats as additives to animal feedstuffs produces a resultant granular product of superior properties in which the caking and setting effects attributable to propylene glycol are enhanced and stabilized resulting in a soft granular foodstuff which remains stable without collapse during transportation, storage, and supply at the feeding station to an animal.

So far as the fatty component is concerned, a wide range of suitable vegetable oils such as soybean oil, corn oil, cottonseed oil, sesame oil and olive oil, and animal oils such as suet, lard, tallow and grease and other powdery fats previously prepared in powder form are available and may be employed. The oils and fats may be used alone or in combination. The fatty component may be supplied in its natural state if fluid. If it is semi-solid at ambient temperature, it may be melted by heating. The fatty component may be added to the powdery foodstuff by itself, or may be mixed with water or with a feedstuff material containing water, such as molasses, corn steep liquor and the like in the presence of a suitable emulsifier such as fatty acid monoglyceride, sugar ester, polyoxyethylenesorbitester or lecithin, which emulsifier may be added directly to the powdery material for the feedstuff.

The fatty component may be added by itself or together with the propylene glycol. When added together with propylene glycol, the two components are suitably premixed in the appropriate proportions; the mixture thus resulting may be subjected to emulsion, granulation and stabilization of the resulting granules at the same time.

In an alternative procedure the components may be added separately, in which case propylene glycol is preferably added first to the powdery feedstuff material, followed by caking and setting of the material. After the product has been granulated to a desired shape and size of granules, the fatty component may be added. Alternatively, part or all of the fatty component may be added to the powdery feedstuff material prior to addition of propylene glycol.

The manner of addition and stage at which such addition is made for the propylene glycol and the fatty component will depend upon various factors, including the nature of the feedstuff to be produced, and the desired properties to be aimed at.

The proportion of fatty component added depends upon the nature of the feedstuff to be produced, the proportion of added propylene glycol, the water content, and the intended use of the feedstuff. We have found that good results are achieved when the fatty component is present in an amount of 2 to 30% by weight of the final product. Even when the foodstuff contains a large proportion of skimmed milk or of sugar material and the fatty component is added in an amount as little as 2% by weight of the final product, a sufficiently stable granular product results. However, for best results the fatty component is present in an amount of 5% or more by weight of the final product.

The proportion of added oil and fat in the final product should not exceed 30% by weight as an increase in the fatty component beyond that figure results in relative impoverishment of the foodstuff so far as essential nutrients such as protein, carbohydrate and vitamins is concerned and the desired nutritional balance of the final product as an animal feedstuff cannot be maintained where the added fat content exceeds 30% by weight.

Various known granulators may be used for granulation of the foodstuff in the practice of the present invention. However, because the caking effect exhibited by propylene glycol is utilized, the heat, pressure and compression generally thought essential in the production of granular or pelleted feedstuffs heretofore, are not required. Thus, granulators which rely upon pressure, such as pellet mills, extruders and expanders are not required for practice of the present invention. Instead, such granulators as may be employed for the simple mixing, compacting and caking of powdery materials with a liquid, including fluidized-bed type granulators, flow type granulators and rotary-plate type granulators, may be employed.

If necessary, to assist in the process, oils and/or fats included in the fatty component may be softened or melted, but in any case, in performing admixture and subsequent granulation of the resultant mixture of basic nutritional materials, propylene glycol and the fatty component, the temperature of the mixture should be 70° C. or less.

By keeping the temperature relatively low, while performing admixture and granulation, nutrients such as vitamins in the basic nutritional material which may not be heat stable are prevented from destruction and useful microbes contained in the basic nutritional material may also be safe from extinction. Vitamins C, E and K have weak resistance to heat and useful microbes such as lactic acid bacteria, bifidobacteria, *Bacillus natto* and other microbes beneficial in animal feedstuffs are all unstable to heat.

The present invention does not require a drying process to be employed. This is to be contrasted with previously proposed caking type methods of producing granular feedstuffs for animals in which heating and drying were required for removal of water in the later steps of granulation when water was employed. However, in practice of the present invention, even when the fatty component is used in the form of an emulsion granulation of the mixed materials may be accomplished under atmospheric or air cooling conditions without need for a heat treatment.

Additionally, though the boiling point of propylene glycol is between 183° and 195° C. under atmospheric pressure conditions, it tends to evaporate even at a substantially lesser temperature when it coexists with water. Thus, if the temperature rises, propylene glycol would tend to vapourize and its caking effect would be lost. For this reason, the temperature of the mixture should be kept at 70° C. or less.

The moisture content of the product should be in the range from 1 to 25% by weight. If the basic nutritional material comprises or consists largely of skimmed milk, sucrose and alphanized corn starch, these materials will naturally provide a moisture content of about 3%. The fatty component may also introduce a moisture content in the range of 0 to 2%. When these materials are mixed with an appropriate proportion of propylene glycol, the natural moisture content of the mixture will be in the region of 2%. Consequently, when added moisture is present in an amount exceeding 25% by weight, it becomes difficult to maintain the moisture activity of the product at 0.9 or less. The moisture activity should be maintained at 0.9 or less to preserve the keeping quality of the product to avoid putrefaction and the generation of harmful microbes during storage.

The invention is further described by way of illustration below with reference to a number of non-limitative Examples.

EXAMPLE 1

A granular foodstuff suitable for use as a substitute milk product for a suckling calf was prepared from the following two preparations:

Preparation 1:
Basic nutritional material for the foodstuff.

| | |
|---|---|
| 75% by weight | skim milk |
| 16% by weight | powdery fat and oil |
| 4% by weight | soluble absorbed fish |
| 5% by weight | a mixture composed of dextrin, glucose, vitamins and living microbial preparation |

The components of Preparation 1 were well mixed by stirring to obtain a mixture used as the nutritional basis for the foodstuff.

Preparation 2:
Fluid containing propylene glycol and fatty component.

| | |
|---|---|
| 76% by weight | feed grade purified tallow |
| 20% by weight | propylene glycol |
| 3% by weight | glycerol mono-aliphatic acid ester |
| 2.5% by weight | soybean lecithin |
| 0.5% by weight | a mixture of ethoxyquin and food flavouring |

The components of Preparation 2 were mixed together and heated at 65° C. to obtain a fluid.

90 parts by weight of Preparation 1 and 10 parts by weight of Preparation 2 were mixed together in a rotary plate type mixing and agitating machine to produce a granular feedstuff adapted for use as a substitute milk for calves.

The resultant product was analysed and found to contain 8.0% by weight of moisture, 21.0% by weight of fat and oil and 2.0% by weight of propylene glycol. The product was found to have a moisture activity of 0.32. The particle size distribution of the starting basic nutritional material and of the finished product were compared by reference to the standard sieve sizes authorised under JIS Standard. This comparison showed that 96.4% of the starting material passed through a sieve with a mesh size of 0.59 mm while for the resultant product, 15.1% passed a mesh size of 2.38 mm, 33.7% passed a mesh size between 2.38 and 1.41 mm and 44.9% passed a mesh size between 1.41 and 0.59 mm, and 6.4% passed a mesh size of 0.59 mm. We recognise this resultant product as an excellent granular feedstuff.

The product so obtained could readily be dissolved in cold or warm water to produce a milk substitute in volume 6 to 8 times the volume of the granular product and suitable for feeding to a suckling calf.

EXAMPLE 2

This Example is concerned with the production of an artificial granular feedstuff for piglets.

Basic feedstuffs in the following proportions were well mixed together by stirring in a Nautamixer:

| | |
|---|---|
| 30% by weight | skim milk |
| 10% by weight | dried whey powder |
| 10% by weight | extracted soybean protein powder |
| 30% by weight | alphanized corn starch |
| 6% by weight | purified glucose |
| 6% by weight | mixture composed of vitamins minerals and living microbial preparation. |

To the mixture so produced was added 6% by weight of propylene glycol and immediately after this the resulting mixture was rapidly mixed. Operation of the mixer was then suspended and the mixture allowed to cake and set to a massecuite-like texture. After standing for about an hour, the mixture lost viscosity and the texture became that of a crumbly solid. The mixer was then restarted and the solids crumbly resulting were removed therefrom. The crumbly solids were transferred to a pulverizer and pulverized to obtain fine particles averaging from about 0.59–2.83 mm or slightly smaller in diameter. Lard previously melted at 50° C. in an amount of 5% by weight was sprayed over the particles which were cooled to room temperature to obtain an artificial granular foodstuff suitable for feeding to piglets.

The product so obtained was analysed and found to contain 7.8% by weight of moisture, 6.0% by weight of fat and oil and 5.7% by weight of propylene glycol.

The product was found to have a moisture activity of 0.67. The product had a particle size distribution as follows: 5.3% by weight passed a mesh size of 2.83 mm, 32.5% by weight passed a mesh size between 2.83 and 2.00 mm, 39.2% by weight passed a mesh size of 2.00 to 1.00 mm, 18.8% by weight passed a mesh size of between 1.00 and 0.59 mm, the remaining 4.2% by weight passing a mesh size of less than 0.59 mm. We recognise this product as being an excellent granular product. We have found it to be an extremely suitable artificial feedstuff for piglets.

EXAMPLE 3

This Example concerns the production of a granular feedstuff for consumption by pigs.

Respective preparations 1 and 2 were first prepared as follows:

Preparation 1:
Nutritional basis for the foodstuff.
The following materials were first mixed together by stirring:

| | |
|---|---|
| 35% by weight | yellow corn powder |
| 15% by weight | wheat powder |
| 12% by weight | alphanized corn starch |
| 25% by weight | de-fatted soybeans |
| 8% by weight | fish meal |
| 5% by weight | a mixture of vitamins and minerals. |

Preparation 2:
Fluid containing propylene glycol and fatty component 20% by weight of water was added to a mixture composed as follows:

| | |
|---|---|
| 30% by weight | molasses |
| 25% by weight | propylene glycol |
| 20% by weight | fat and oil |
| 5% by weight | emulsifier |

The fluid mixture was well mixed to obtain an emulsion. 67 parts by weight of Preparation 1 were mixed with 33 parts by weight of Preparation 2 in a vibrating type contact and granulation device in which the basic nutritional material was granulated while the emulsion was sprayed thereupon.

The resultant product was analysed and found to contain 16.9% by weight moisture, 10.2% by weight of fat and oil and 8.8% by weight of propylene glycol. It was found to have a moisture activity of 0.89.

The resultant particles had diameters of 4 mm or more and were almost round in shape. The product proved highly palatable to young pigs having a live weight of 25 Kg, was consumed with gusto and provided excellent weight increase.

In the present invention, the polyethylene glycol acts to agglomerate the powdered feedstuff products. If the thus agglomerated feedstuff were then formed into grains without further processing, these grains would be lumpy and overly dense. When fat is sprayed and coated upon the surface of the feedstuff, agglomerated with polyethylene glycol and formed into grains, these coated grains retain their soft, yet firm, texture. Part of the softening and stabilizing action of the fat results from a tendency for some of the fat to seep into the grain, thus having a softening effect upon the food similar to the softening effect that fat exhibits when present in natural beef. Another part of the stabilizing and softening effect of the fat coating is a result of the coating itself. By enveloping the feedstuff, the fat prevents the evaporization or the polyethylene glycol therein. Further, the fat coating protects the granules and prevents further agglomeration between particles.

What is claimed as new and intended to be covered by Letters Patent is:

1. A method for the preparation of an animal feedstuff in soft granular form consisting essentially of admixing a powdered nutritionally balanced pig or calf feed with 1–10% propylene glycol in a mixture with stirring and at a temperature of 70° C. or less to agglomerate the mixture; allowing the mixture to stand unstirred in the mixer for a period of time sufficient to cake and solidify the mixture; reoperating the mixer to particulate the solidified mixture and removing the particles therefrom; pulverizing said particles to form powdered granules; spraying the powdered granules with 2–30% fat or oil to provide dimensional stability and cooling the sprayed granules, thereby providing a dimensionally stabilized soft granular feedstuff having from 2 to 25% by weight of moisture and a moisture activity of less thatn 0.90.

* * * * *